United States Patent
Bok et al.

(10) Patent No.: US 8,488,020 B2
(45) Date of Patent: Jul. 16, 2013

(54) IMAGING DEVICE, METHOD FOR CONTROLLING THE IMAGING DEVICE, AND RECORDING MEDIUM RECORDING THE METHOD

(75) Inventors: Young-soo Bok, Suwon-si (KR); Hyun-seok Kim, Suwon-si (KR); Jae-hyo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 542 days.

(21) Appl. No.: 12/511,192

(22) Filed: Jul. 29, 2009

(65) Prior Publication Data

US 2010/0026857 A1    Feb. 4, 2010

(30) Foreign Application Priority Data

Jul. 29, 2008 (KR) .................. 10-2008-0074093

(51) Int. Cl.
*H04N 17/00* (2006.01)
*H04N 17/02* (2006.01)
*H04N 5/235* (2006.01)
*H04N 5/217* (2006.01)

(52) U.S. Cl.
USPC .................. 348/230.1; 348/187; 348/241

(58) Field of Classification Search
USPC ............ 348/187, 188, 222.1, 229.1, 230.1, 348/231.3, 231.6, 241, 243
See application file for complete search history.

(56) References Cited

U.S. PATENT DOCUMENTS

| | | | |
|---|---|---|---|
| 2004/0085459 A1* | 5/2004 | Hoshuyama et al. | 348/223.1 |
| 2008/0031610 A1* | 2/2008 | Border et al. | 396/89 |
| 2008/0158396 A1* | 7/2008 | Fainstain et al. | 348/246 |
| 2009/0009649 A1* | 1/2009 | Okamoto | 348/340 |

OTHER PUBLICATIONS

"Film Speed"—Wikipedia, http://en.wikipedia.org/w/index.php?title=Film_speed&oldid=226651751; Jul. 19, 2008.*

* cited by examiner

*Primary Examiner* — Daniel M Pasiewicz
(74) *Attorney, Agent, or Firm* — Drinker Biddle & Reath LLP (57) ABSTRACT

An imaging device includes a photographing device configured to photograph an object and generate an image signal, a gain storage register configured to store a gain determined for the photographing device, a gain adjustment unit configured to adjust the image signal using the gain, and a noise reduction unit configured to reduce noise of the image signal using a noise filter selected based on the gain.

19 Claims, 5 Drawing Sheets

IMAGING DEVICE, METHOD FOR CONTROLLING THE IMAGING DEVICE, AND RECORDING MEDIUM RECORDING THE METHOD

CROSS-REFERENCE TO RELATED PATENT APPLICATIONS

This application claims the benefit of Korean Patent Application No. 10-2008-0074093, filed on Jul. 29, 2008 in the Korean Intellectual Property Office, the entire contents of which is incorporated herein by reference.

BACKGROUND OF THE INVENTION

1. Field of the Invention

The present invention relates to an imaging device, methods thereof, and a computer readable medium recording methods thereof, in which a gain determined for the photographing device is used to correct a luminance level of an image signal and after the gain is used, noise of the image signal is reduced based on the gain used.

2. Description of the Related Art

Photographing devices are manufactured in a general semiconductor manufacturing process. An irregular doping level in the semiconductor manufacturing process may cause a defect in the photographing device. The defect may generate noise and deteriorate an image quality. Accordingly, different manufactured digital camera may generate an image signal having different luminance levels under the same luminance condition. Therefore, there is a need in the art to correct the luminance levels generated by photographing devices.

SUMMARY OF THE INVENTION

To solve the above and/or other problems, the present invention provides an imaging device which can reduce a noise deviation generated due to the gains applied to correct a luminance level of an image signal in a photographing device, a method for controlling the imaging device, and a computer readable medium recording the method.

According to an aspect of the present invention, an imaging device includes a photographing device configured to photograph an object and generate an image signal, a gain storage register configured to store a gain determined for the photographing device, a gain adjustment unit configured to adjust the image signal using the gain, and a noise reduction unit configured to reduce noise of the image signal using a noise filter selected based on the gain.

The noise reduction unit may include a gain reading unit configured to read the gain, a first register configured to store a database of noise filters for different values of the gain, and a noise filter application unit configured to reduce noise of the image signal using a noise filter selected based on the read gain.

The first register may store a database of noise filters that reduce a larger amount of noise of the image signal as the gain applied to the photographing device increases.

The noise filter application unit may select a noise filter based on the read gain from the database and applies the selected noise filter to the image signal.

The gain stored in the gain storage register may determined based on a doping level of the photographing device.

The gain stored in the gain storage register may be determined for the photographing device to correct a deviation in luminance.

The imaging device may include a sensitivity setting unit configured to set a sensitivity of the photographing device.

The noise reduction unit may include a sensitivity reading unit configured to read the set sensitivity of the photographing device, a gain reading out unit configured to read the applied gain, a second register configured to store a database of noise filters for different pairs of the sensitivity and the gain, and a noise filter application unit configured to reduce noise of the image signal using a noise filter selected based on the read sensitivity and gain.

The stored noise filters may reduce a larger amount of noise of the image signal as the gain applied to the photographing device increases and the sensitivity increases.

The noise filter application unit may select a noise filter based on the read sensitivity and the read gain from the database and applies the selected noise filter to the image signal.

A method of controlling an imaging device of a photographing device may include generating an image signal of an image, reading out a gain determined for the photographing device, selecting a noise filter based on the read gain, and reducing noise of the image signal using the selected noise filter.

The method may further include storing a gain determined based on a doping level of the photographing device.

The method may further include storing a gain determined for the photographing device to correct a deviation in luminance for each photographing device.

The method may further include storing a database of noise filters that reduce a larger amount of noise of the image signal as the gain applied to the photographing device increases.

Selecting a noise filter may include selecting a noise filter from the database based on the read gain.

The method of claim 11 may further include setting a sensitivity, and reading out a set sensitivity, wherein selecting the noise filter may include selecting the noise filter based on the read gain and the read sensitivity.

The method may further comprise storing a database of noise filters that reduce a larger amount of noise of the image signal as the gain applied to the image signal increases and the sensitivity increases.

Selecting may include selecting the noise filter from the database based on the read gain and the read sensitivity.

A computer-readable medium encoded with a computer-executable program may perform a method including generating an image signal of an image, reading out a gain determined for the photographing device, selecting a noise filter based on the read gain, and reducing noise of the image signal using the selected noise filter.

The computer readable medium may further include method steps including setting a sensitivity, reading out a set sensitivity, wherein selecting the noise filter may include selecting, the noise filter based on the read gain and the read sensitivity.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining exemplary embodiments of the invention with reference to the attached drawings. Like reference numerals in the drawings denote like elements.

Figure 1:
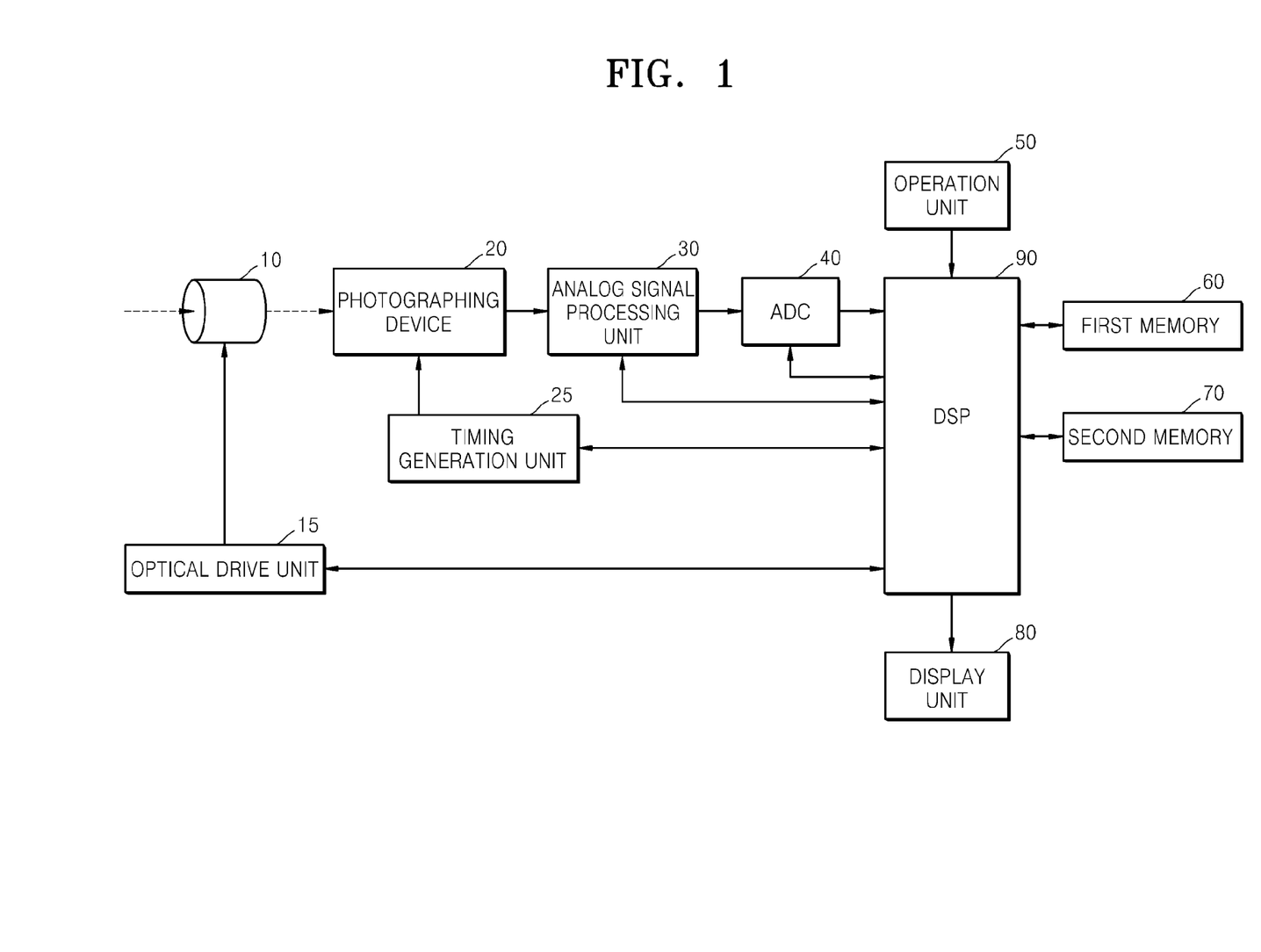
FIG. 1 is a block diagram of an imaging device according to an example of an embodiment of the present invention.

FIG. 1 is a block diagram of an imaging device according to an embodiment of the present invention. In the present embodiment, a digital camera is described as an example of the imaging device.

Referring to FIG. 1, the digital camera includes an optical unit 10 including an optical signal, a photographing device 20 receiving an optical signal from the optical unit 10 and photographing an image of an object (not shown), an analog signal processing unit 30 performing a predetermined image signal process with respect to an analog image signal generated by the photographing device 20, an analog-to-digital converter (ADC) 40 converting the image signal to a digital signal, an operation unit 50 receiving an operation signal that is externally input, a first memory 60 temporarily storing the image signal, a second memory 70 storing a program, a display unit 80 displaying the image signal or the operation of the digital camera, and a digital signal processor (DSP) 90 controlling the overall operation of the digital camera.

The optical signal from the object may pass through the optical unit 10 to the photographing device 20. The optical unit 10 may include a lens (not shown) concentrating the optical signal, an iris (not shown) controlling the quantity (light amount) of the optical signal, and a shutter (not shown) controlling the input of the optical signal. Also, the lens may include a zoom lens controlling a viewing angle to be narrow or wide according to a focal length and a focus lens focusing a focal point of the object. These lenses may be formed of a respective single lens or a group of a plurality of lenses.

The optical unit 10 may be driven by an optical drive unit 15. For example, the optical drive unit 15 may control the position of each lens, the opening/closing of the iris, and the operation of the shutter. The lens may be moved to focus on the object. Also, the amount of light may be adjusted by controlling the opening/closing of the iris or shutter. The optical drive unit 15 receives image information input in real time or user input information from the DSP 90 and drive the optical unit 10 based on the information.

The optical signal passing through the optical unit 10 forms an image of the object on a light receiving surface of the photographing device 20. A charge coupled device (CCD) or a complementary metal oxide semiconductor image sensor (CIS) for converting an optical signal to en electric signal may be used as the photographing device 20. A timing generation unit 25 may adjust a charge accumulation time and an output time of the accumulated charges of the photographing device 20, thereby controlling a sensitivity. The timing generation unit 25 may control the operation of the photographing device 20 according to the image signal process of the DSP 90.

In embodiments, the analog signal processing unit 30 performs correlated double sampling by sampling and holding the analog image signal supplied by the photographing device 20 and adjusts the amplitude by automatically applying an appropriate gain to the image signal that is correlated double sampled. In embodiments, the gain is applied to make an integration value to be similar to a reference value after the DSP 90 integrates the image signal converted to the digital signal. In embodiments, the gain is automatically adjusted according to a feedback signal output from the DSP 90.

In embodiments, the analog signal processing unit 30 adjusts the gain to correct the luminance level of the image signal generated by the photographing device 20. One reason this may be needed is that different photographing devices 20 may generate different luminance levels for the same optical signal because the doping levels may have been manufactured at different levels for the different photographing devices 20. It may be difficult and/or expensive to manufacture the photographing devices 20 at the same doping levels.

Because different photographing devices 20 may generate different luminance levels for the same optical signal, the deviation from a normative value for a particular photographing device 20 may be determined and corrected with a gain and the gain for the particular photographing device 20 may be recorded so that an appropriate gain can be applied to adjust the generated luminance levels from the photographing device 20. By determining the gain for each particular photographing device 20 each digital camera 20 may be configured to generate an image signal of the same or similar luminance levels for a given optical signal.

For example, three photographing devices 20, device A, device B, and device C, may be manufactured and included in different digital cameras, A, B, and C. When the digital cameras A, B, and C are used under the same conditions with a sensitivity of 8 LV at ISO 100, an iris value of F 2.8, and a shutter speed of 1/30 second, digital cameras A, B, and C may respectively generate image signals (from the photographing devices 20) having luminance levels of 150, 118, and 90. To normalize the different luminance levels a gain may be determined for each photographing device A, B, and C. For example, a gain of 50 may be applied to the image signal of photographing device B with a luminance level of 118. A gain of 50−a may be applied to photographing device A and a gain of 50+b may be applied to photographing device C. The gains are applied to correct the luminance level of the generated image signal so that a normalized image signal having a luminance level in the same range may be generated in each of the photographing devices A, B, can C. The values of "a" or "b" may be in the range of −3 to 8. Thus, a difference of 11 may occur among the gains for different photographing devices.

However, the image signal of the digital camera has a different degree of noise according to the gain applied to the luminance levels of the image signals. For example, in embodiments, a difference of 16 between gain values causes noise of about 6 dB and a difference of 11 may cause noise of about 4.2 dB. In embodiments, a degree of noise in the image signal of digital camera A is different from that of digital camera C. In embodiments, the analog signal processing unit 30 applies the gain adjusted according to the photographing device 20 as described above to the analog image signal provided by the photographing device 20. In embodiments the analog signal processing unit 30 removes noise of a high frequency component by performing correlated double sampling, and applies the gain automatically adjusted according to the feedback signal output from the DSP 90. The analog image signal is output to the ADC 40. The ADC 40 converts the analog signal to a digital signal and outputs the digital signal to the DSP 90.

In embodiments, the operation unit 50 includes a zoom-in button and a zoom-out button respectively decreasing and increasing a viewing angle according to an input, and a variety of function buttons for inputting text, selecting a mode such as a live-view mode or a replay mode, and setting a sensitivity, white balance, and exposure. Embodiments, of the operation unit 50 include, but are not limited to, a keyboard, a touch pad, a touch screen, and a remote controller.

In embodiments, the first memory 60 exchanges data with the DSP 90 and a CPU (not shown) of the DSP 90. For example, the first memory 60 may temporarily store the image signal provided by the ADC 40, the image data that is image signal processed by the DSP 90, and image data restored from an image file. The first memory 60 may be embodied by a DRAM.

In embodiments, the second memory 70 is a place for storing information desired by a manufacturer and/or a user. For example, the manufacture may store a program for operating the digital camera, or an image file, in the second memory 70. Embodiments, of the second memory 70 include, but are not limited by, a ROM and a flash memory. In embodiments, the first memory 60 and the second memory 70 may be a single memory.

In embodiments, the display unit 80 may display the operation state of the digital camera or a photographed image or an image restored from the stored image file. Embodiments of the display unit 80 include, but are not limited to, a liquid crystal display (LCD) device, an organic light emitting display (OLED) device, and an electrophoresis display (EDD) device.

In embodiments, the DSP 90 reduces noise of the image signal that is converted to the digital signal. The DSP 90 may perform, to the image signal, an image signal process such as gamma correction, color filter array interpolation, color matrix, color correction, and color enhancement. The DSP 90 may generate an image file by compressing the image data generated by performing an image signal process, and may restore image data from an image file. The DSP 90 may generate a control signal controlling the respective constituent parts according to the image data. For example, the DSP 90 may produce an integration value of the image data, compare the integration value and a reference value, and generate a control signal instructing the analog signal processing unit 30 to adjust a gain to approximate the reference value The DSP 90 may receive necessary information from the respective constituent parts. For example, when the analog signal processing unit 30 applies a gain according to the photographing device 20, the DSP 90 may read out the gain from the analog signal processing unit 30. The DSP 90 may control the overall operations of the digital camera.

Figure 2:
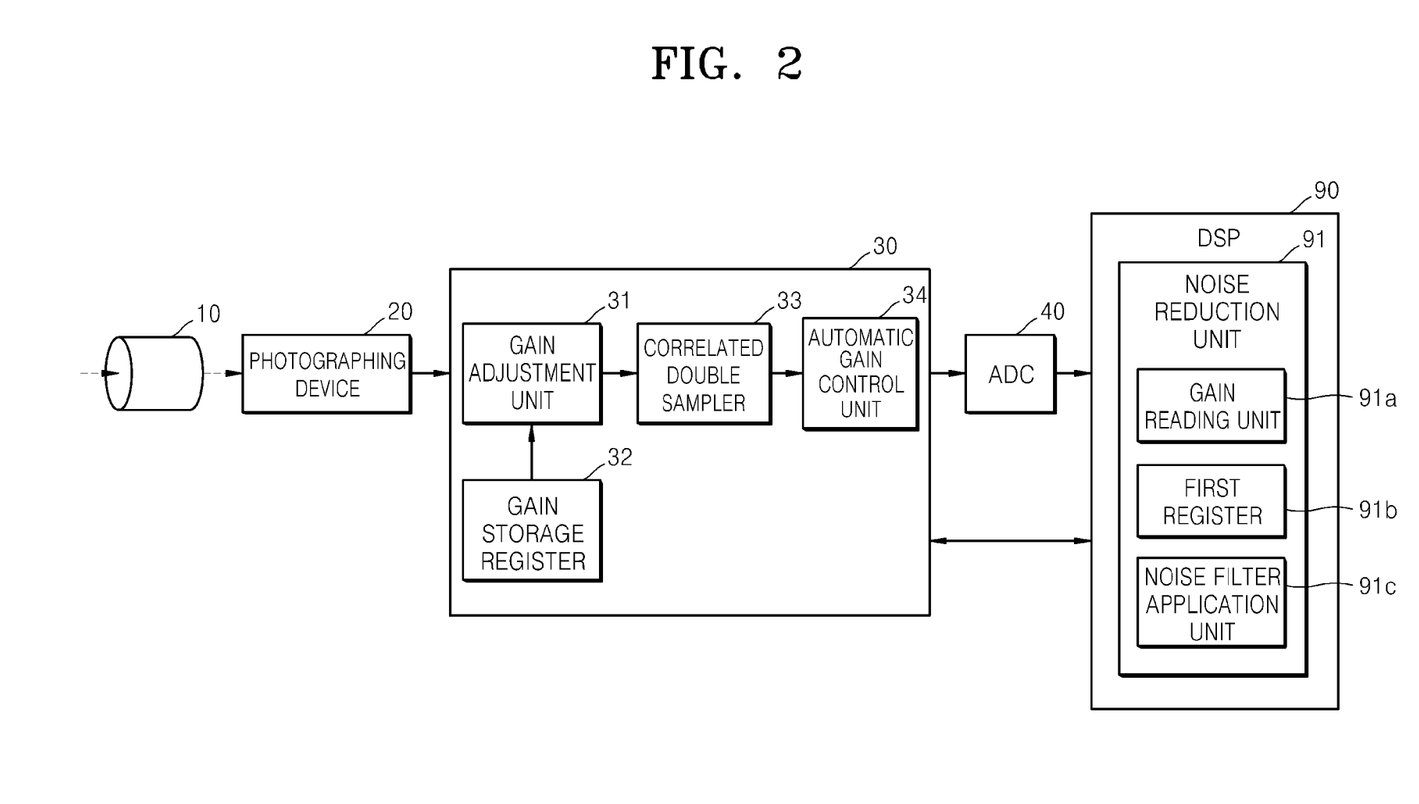
FIG. 2 is a block diagram of the analog signal processing unit and the digital signal processing unit of the imaging device of FIG. 1 according to an example of an embodiment of the present invention.
Figure 3:
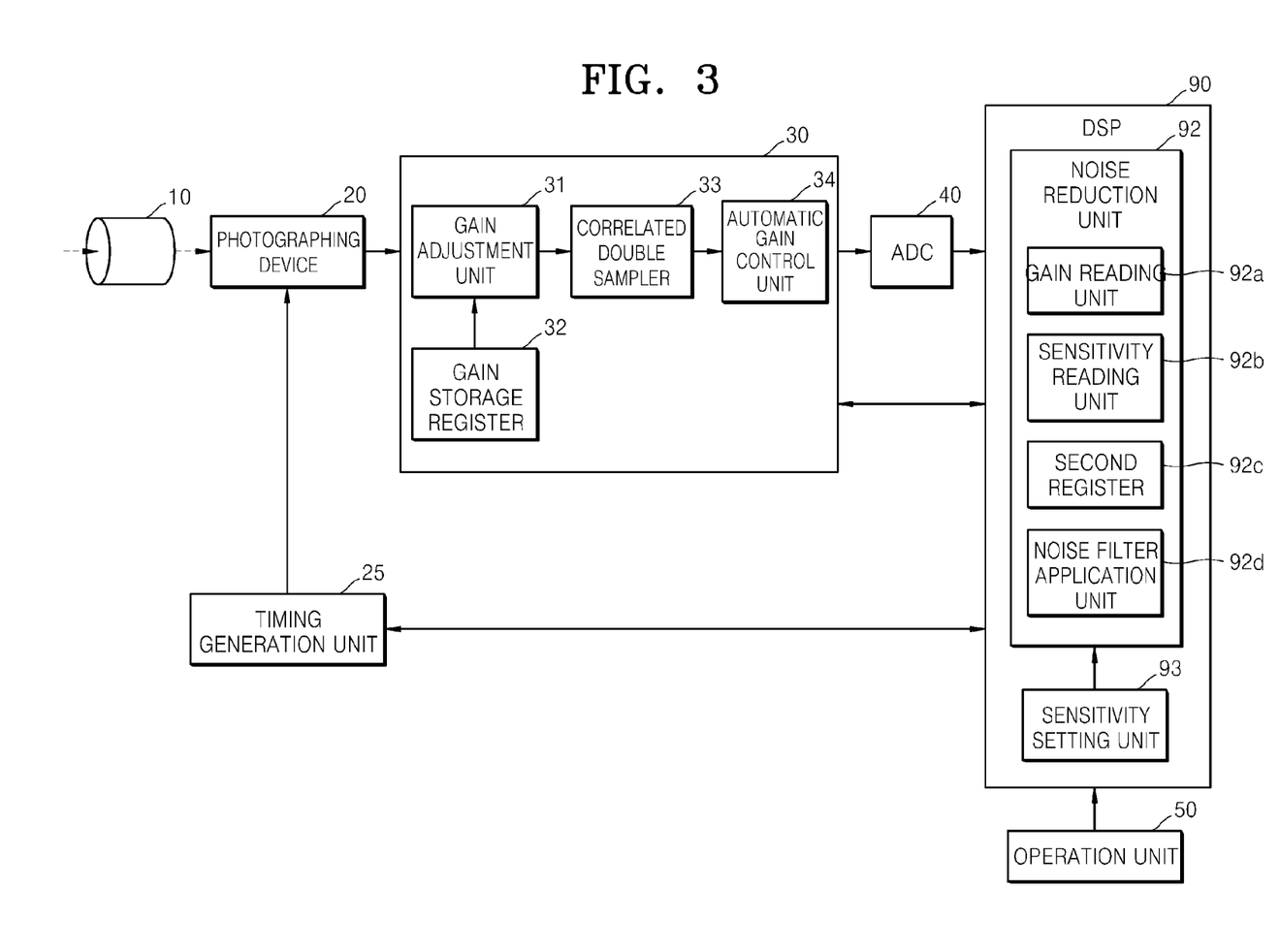
FIG. 3 is a block diagram of the analog signal processing unit and the digital signal processing unit of the imaging device of FIG. 1 according to an embodiment of the present invention.

The analog signal processing unit 30 and the DSP 90 of the imaging device of FIG. 1 will be described in detail with reference to FIGS. 2 and 3. Since the imaging devices of FIGS. 2 and 3 are similar to the image device of FIG. 1, only different parts will be described herein.

First, the digital camera according to an example of an embodiment of the present invention will be described with reference to FIG. 2. Referring to FIG. 2, an optical signal is input to the optical unit 10 and received by the photographing device 20, thereby forming an image of an object (not shown). The image signal that is an analog signal is provided to the analog signal processing unit 30 to perform a predetermined signal process.

In embodiments, the analog signal processing unit 30 includes a gain adjustment unit 31, a gain storage register 32, a correlated double sampler 33, and an automatic gain control unit 34. To correct a difference in the luminance level, in the digital camera, a deviation in luminance according to the photographing device 20 is determined and a gain for correcting the luminance deviation is stored in the gain storage register 32.

The gain stored in the gain storage register 32 may be determined based on the doping level of the photographing device 20. Thus, the gain adjustment unit 31 receives the gain according to the photographing device 20 from the gain storage register 32 and corrects the illumination deviation according to the photographing device 20.

The image signal in which the luminance deviation is corrected is output to the correlated double sampler 33. The correlated double sampler 33 removes a high frequency noise component. The automatic gain control unit 34 applies a gain that is automatically selected according to a feedback signal provided by the DSP 90 to the image signal. Thus, an image signal having a desired luminance level may be output.

The image signal may be output to the ADC 40. The ADC 40 converts the image signal to a digital signal in the ADC 40 and outputs the digital signal to the DSP 90. In embodiments, the major function of the DSP 90 is to reduce noise due to the gain of the image signal.

The DSP 90 may include a noise reduction unit 91 where the noise reduction signal process is performed. The noise reduction unit 91 includes a gain reading unit 91a, a first register 91b, and a noise filter application unit 91c. The gain reading unit 91a reads out the applied gain from the gain storage register 32 where the gain according to the photographing device 20 is stored. The first register 91b stores a database of noise filters for different values of the gain. A noise filter corresponding to the applied gain is selected from the database of the first register 91b. The database contains noise filters according to the gain in order to apply a noise filter that has more of a noise reduction effect of the image signal as the gain applied to the photographing device 20 increases. The noise filter application unit 91c performs a noise reduction signal process of the image signal by applying the selected noise filter.

FIG. 3 is a block diagram of the analog signal processing unit and the digital signal processing unit of the imaging device of FIG. 1 according to an example of an embodiment of the present invention. In the present embodiment, in a digital camera, a noise filter is differently designed in consideration of not only the gain applied according to the photographing device 20 in the photographing device of FIG. 2, but also a sensitivity.

Referring to FIG. 3, an optical signal is input through the optical unit 10. The optical signal is converted to an electric signal by the photographing device 20. The electric signal is output to the analog signal processing unit 30. The gain adjustment unit 31 of the analog signal processing unit 30 applies a gain according to the photographing device 20 to correct a deviation in luminance according to the particular photographing device 20. The correlated double sampler 33 removes a high frequency noise component. An amplitude adjustment is performed to generate an image signal of a desired luminance level based on a control signal fed back from the automatic gain control unit 34 to the DSP 90. The gain adjusted by the gain adjustment unit 31 is recorded in the gain storage register 32. The image signal that is analog signal processed is converted to a digital image signal by the ADC 40.

The DSP 90 performs a noise reduction signal process with respect to the digital image signal. In embodiments, the DSP 90 includes a noise reduction unit 92 and a sensitivity setting unit 93. The noise reduction unit 92 includes a gain reading unit 92a, a sensitivity reading unit 92b, a second register 92c, and a noise filter application unit 92d. In the noise reduction unit 92, the gain reading unit 92a reads out a gain to be applied, from the gain storage register 32. A sensitivity is set by inputting a user sensitivity setting signal via the operation unit 50 or is automatically set by the sensitivity setting unit 93. The timing generation unit 25 controls a charge accumulation time and an accumulated charge discharge time of the photographing device 20, in response to the set sensitivity.

Referring back to the noise reduction unit 92, the sensitivity set by the sensitivity setting unit 93 is read out by the sensitivity reading unit 92b. The second register 92c stores in database of noise filters according to the sensitivity and the gain applied according to the particular photographing device 20. The noise filter application unit 92d selects a noise filter corresponding to the gain and sensitivity from the database stored in the second register 92b and applies the selected noise filter to the image signal.

Since noise increases as sensitivity increases, the sensitivity may also serve as an important factor in the generation of noise. Thus, the database stored in the second register 92b may be a database of noise filters according to a gain having a higher noise reduction effect as the gain increases and the sensitivity increases. Thus, the noise deviation according to the photographing device 20 may be reduced by reading out the sensitivity set as above and designing a noise filter considering the read sensitivity and the gain according to the particular photographing device 20.

Figure 4:
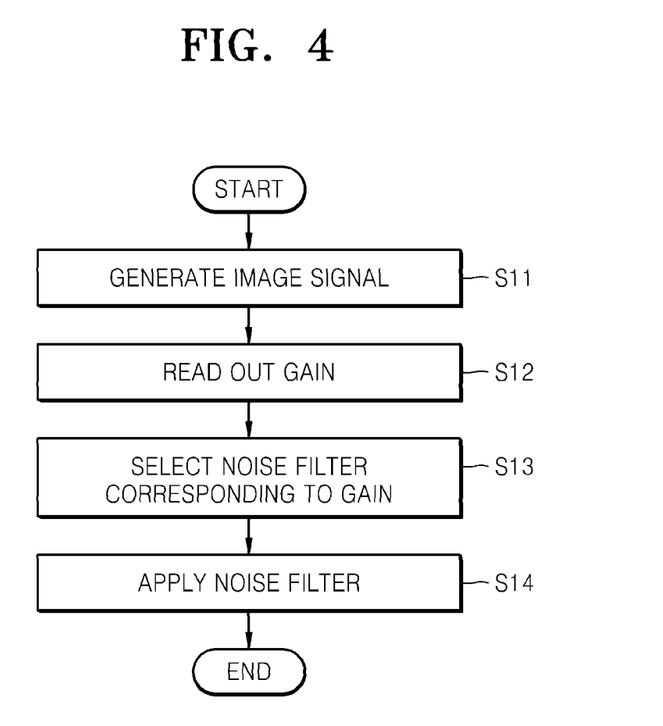
FIG. 4 is a flowchart for explaining a method of controlling the imaging device according to an example of an embodiment of the present invention.

FIG. 4 is a flowchart for explaining a method of controlling the imaging device according to an example of an embodiment of the present invention. In embodiments, a digital camera is described as an example of the imaging device. Referring to FIG. 4, during a live view mode in a digital camera, a capture signal is input to generate an image signal (S11). A gain applied according to a photographing device in the digital camera is read out (S12). The operation S12 may be performed before the image signal is generated.

A noise filter corresponding to the read gain is selected (S13). The noise filter may be selected from a database of noise filters according to the gain applied to the particular photographing device. The database may be built by experience and stored in advance. In embodiments, a storing operation of the generated image signal may be included. In the digital camera, the selected noise filter is applied to the image signal to remove a noise component (S14).

Figure 5:
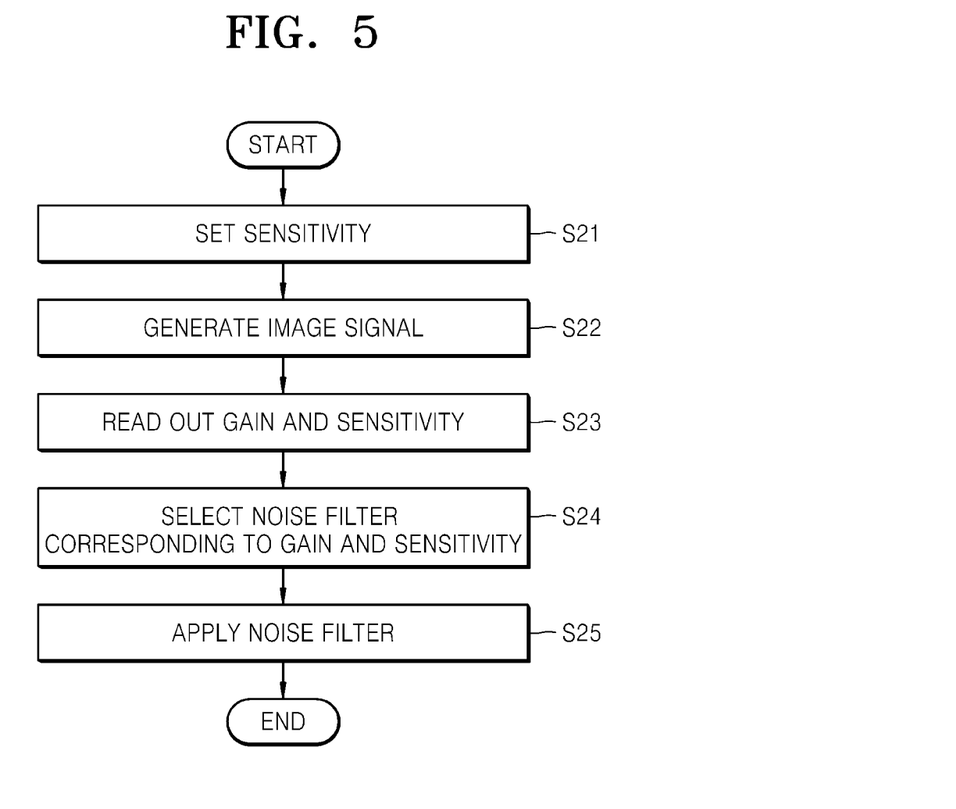
FIG. 5 is a flowchart for explaining a method of controlling the imaging device according to an example of an embodiment of the present invention.

FIG. 5 is a flowchart for of a method of controlling the imaging device according to an example of an embodiment of the present invention. In embodiments, a digital camera is described as an example of the imaging device. Referring to FIG. 5, a sensitivity is set automatically or by being operated by a user (S21). The user may set a sensitivity when using a digital camera. An image signal is generated according to the sensitivity in the digital camera (S22). The set sensitivity and a gain applied according to a photographing device are read out (S23). A noise filter corresponding to the read sensitivity and gain is selected (S24). A database of noise filters according to the sensitivity and gain may be stored in advance. A storing operation of the generated image signal may be included. In the digital camera, the selected noise filter is applied to the image signal to perform a noise reduction algorithm (S25).

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

For convenience, in the description above, the functionality described has been divided into a number of units; however, the number of units may vary and the functionality described above may be differently divided among the units, or the functionality described above may be implemented without units.

The various illustrative units described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. While the present invention has been particularly shown and described with reference to exemplary embodiments thereof, it will be understood by those of ordinary skill in the art that various changes in form and details may be made therein without departing from the spirit and scope of the present invention as defined by the following claims.

As described above, according to the present invention, the noise deviation according to the gain applied to correct the luminance level of an image signal according to the photographing device may be prevented by differently designing a noise filter according to the gain.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An imaging device comprising:
   a photographing device configured to generate an image signal representative of an object;
   a gain adjustment unit configured to adjust the image signal using a gain selected to compensate a deviation in luminance originating from the photographing device's manufacturing process; and
   a noise reduction unit configured to reduce noise in the image signal using a noise filter selected based on the gain.

2. The imaging device of claim 1, further comprising a memory to store a database of noise filters for different gain values.

3. The imaging device of claim 2, wherein the noise filters reduce increasing amounts of noise in the image signal as the gains increase.

4. The imaging device of claim 2, wherein the noise reduction unit is to select the noise filter from the database based on the gain, and apply the selected noise filter to the image signal.

5. The imaging device of claim 1, wherein the gain is selected to compensate for a doping level of the photographing device.

6. The imaging device of claim 1, further comprising a sensitivity setting unit configured to set a sensitivity of the photographing device.

7. The imaging device of claim 6, further comprising
a memory to store a database of noise filters for different pairs of sensitivities of the photographing device and gains.

8. The imaging device of claim 7, wherein the noise filters reduce increasing amounts of noise in the image signal as the gains and the sensitivities increase.

9. The imaging device of claim 6, wherein the noise reduction unit is to select the noise filter based on the sensitivity and gain, and apply the selected noise filter to the image signal.

10. A method of controlling an imaging device including an image sensor, the method comprising:
selecting a noise filter based on a gain selected to compensate for a deviation in luminance originating from the image sensor's manufacturing process; and
reducing noise in an image signal generated by the image sensor using the selected noise filter.

11. The method of claim 10, wherein the deviation in luminance is associated with a doping level of the image sensor.

12. The method of claim 10, wherein selecting the noise filter comprises selecting the noise filter from a database of noise filters based on the gain.

13. The method of claim 12, wherein the noise filters reduce a larger amount of noise as the gains increase.

14. The method of claim 10, further comprising selecting the noise filter based on the gain and a sensitivity of the image sensor.

15. The method of claim 14, wherein selecting the noise filter comprising selecting the noise filter from a database of noise filters based on the gain and the sensitivity.

16. The method of claim 15, wherein the noise filters reduce a larger amount of noise as the gains and the sensitivities increase.

17. A non-transitory computer-readable medium storing a computer-executable program that, when executed, causes a machine to at least:
select a noise filter based on a gain selected to compensate for a deviation in luminance originating from an image sensor's manufacturing process; and
reduce noise in an image signal generated by the image sensor using the selected noise filter.

18. The non-transitory computer readable medium of claim 17, wherein the computer-executable program, when executed, causes the machine to select the noise filter based on the gain and a sensitivity associated with the image sensor.

19. The imaging device of claim 1, wherein the gain is an analog gain applied by the photographing device to generate the image signal, and the gain adjustment unit is to adjust the image signal by selecting the analog gain.

\* \* \* \* \*